(12) United States Patent
Fraim et al.

(10) Patent No.: US 6,167,751 B1
(45) Date of Patent: Jan. 2, 2001

(54) LEAK ANALYSIS

(75) Inventors: Freeman W. Fraim, Lexington; Francis A. Di Bella, Roslindale; David H. Fine, Lincoln; John S. Beaty, Belmont, all of MA (US)

(73) Assignee: Thermedics Detection, Inc., Chelmsford, MA (US)

( * ) Notice: Under 35 U.S.C. 154(b), the term of this patent shall be extended for 0 days.

(21) Appl. No.: 08/979,180

(22) Filed: Nov. 26, 1997

(Under 37 CFR 1.47)

(51) Int. Cl.[7] .................................................... G01M 3/34
(52) U.S. Cl. ............................................................ 73/49.3
(58) Field of Search .................................. 73/49.3, 49.2, 73/37, 52, 45.4, 41

(56) References Cited

U.S. PATENT DOCUMENTS

| | | | | |
|---|---|---|---|---|
| 2,093,429 | * | 9/1937 | Foss | 73/49.3 |
| 3,513,689 | * | 5/1970 | Nelson | 73/37 |
| 3,650,145 | * | 3/1972 | Nelson | 73/37 |
| 3,751,972 | * | 8/1973 | Hass | 73/45.4 |
| 3,837,215 | * | 9/1974 | Massage | 73/45.4 |
| 3,837,228 | * | 9/1974 | Nemeth et al. | 73/40.7 |
| 3,859,844 | * | 1/1975 | Hruby | 73/45.4 |
| 4,117,718 | * | 10/1978 | Hayward | 73/52 |
| 4,188,819 | * | 2/1980 | Egee et al. | 73/52 |
| 4,542,643 | * | 9/1985 | Himmelstein | 73/49.2 |
| 4,663,964 | * | 5/1987 | Croce | 73/49.3 |
| 4,756,184 | | 7/1988 | Reishus et al. . | |
| 4,771,630 | * | 9/1988 | Croce et al. | 73/49.3 |
| 4,862,732 | | 9/1989 | Raymond et al. . | |
| 4,893,499 | | 1/1990 | Layton et al. . | |
| 4,899,574 | * | 2/1990 | Potteiger | 73/52 |
| 4,901,558 | * | 2/1990 | Leining et al. | 73/49.3 |
| 4,930,345 | | 6/1990 | Bausch . | |
| 4,934,180 | * | 6/1990 | Hulsman | 73/49.3 |
| 4,953,396 | * | 9/1990 | Langsdorf et al. | 73/49.3 |
| 5,082,366 | * | 1/1992 | Tyson et al. | 356/35.5 |
| 5,105,654 | * | 4/1992 | Maruyama et al. | 73/49.3 |
| 5,239,859 | * | 8/1993 | Lehman | 73/49.2 |
| 5,287,729 | | 2/1994 | Lehmann . | |
| 5,388,446 | * | 2/1995 | Kronberg | 73/40.7 |
| 5,405,231 | * | 4/1995 | Kronberg | 414/220 |
| 5,566,569 | * | 10/1996 | Achter et al. | 73/37 |

FOREIGN PATENT DOCUMENTS

| | | |
|---|---|---|
| 399 225 | 4/1995 | (AT) . |
| 40 09 838 A1 | 2/1991 | (DE) . |
| 44 12 762 A1 | 10/1994 | (DE) . |
| 59090026 | 5/1984 | (EP) . |
| 06221954 | 8/1994 | (EP) . |

* cited by examiner

Primary Examiner—Hezron Williams
Assistant Examiner—Jay L. Politzer
(74) Attorney, Agent, or Firm—Ernest V. Linek; Banner & Witcoff, Ltd.

(57) ABSTRACT

A container with a flexible membrane sealed to a container end may be tested for leaks as the container moves along a conveyor. The conveyor carries the container through a first region in which a negative pressure differential is established between the first region and the interior of the container. The pressure differential can be established, for example, by cooling the first region with cold air. The conveyor also carries the container from the first region to a second region, in which a positive pressure differential is established between the second region and the interior of the container. The pressure differential in the second region can be established, for example, by heating the second region with hot air. In the second region, a sensor detects a transition of the membrane of the container between convex and concave orientations and produces a signal corresponding to the occurrence of the transition. A controller receives the signal from the sensor and determines whether the container has a leak based on the transition of the membrane.

21 Claims, 6 Drawing Sheets

LEAK ANALYSIS

TECHNICAL FIELD

The invention relates to the analysis (e.g., detection and rate measurement) of leaks in containers having flexible ends.

BACKGROUND INFORMATION

In packaging, for example, food, beverage, or pharmaceutical products, the products often are placed in rigid containers in which one or both ends of the container are sealed with a removable flexible membrane. The integrity of the seal between the membrane and the container is critical to protecting the product in the container. In addition, a consumer must be able to open the seal by exerting a reasonable amount of force. The need for high seal strength implies that a strong seal should be used, while the need for easy access to the product in the container implies that a weak seal should be used. For those reasons, the strength of the seal must be precisely controlled.

SUMMARY

The invention provides techniques for rapidly determining the presence of minuscule leaks in containers moving on a conveyor at speeds on the order of 1,200 containers per minute. More specifically, the invention provides techniques for measuring leakage in containers having holes with dimensions on the order of 4 microns. In some implementations, the techniques rely upon the behavior of the container's flexible membrane as a result of rapid sequential applications of pressure and vacuum to a chamber surrounding the container.

In one general aspect, the invention features determining whether a container that has a flexible membrane and is moving along a conveyor has a leak. The conveyor carries the container through a first region in which a negative pressure differential between the first region and the interior of the container is established. The conveyor also carries the container through a second region in which a positive pressure differential between the second region and the interior of the container is established. A sensor is configured to detect a transition of the membrane of the container between convex and concave orientations and to produce a signal corresponding to the occurrence of the transition. The sensor is connected to a controller that receives the signal from the sensor and is configured to determine whether the container has a leak based on the transition of the membrane.

Embodiments may include one or more of the following features. For example, the container may pass through the first region prior to passing through the second region, and the sensor may detect a transition of the membrane from a concave orientation to a convex orientation in the second region. The container also may pass through the second region prior to passing through the first region, and the sensor may detect a transition of the membrane from a convex orientation to a concave orientation in the first region.

A negative pressure differential may be generated in the first region by cooling the container. In the second region, the positive pressure differential may be generated by heating the container or by passing the container through a high velocity zone to produce a low pressure zone around the container.

The controller may determine whether the container has a leak based upon a time at which the transition of the membrane occurs. A rejector may be configured to remove a container from the conveyor and the controller may be configured to send a signal to the rejector to cause removal of a container when the controller determines that the container has a leak. This detection of leaks and removal of rejected containers from the conveyor provides the considerable advantage of providing for rapid and continuous inspection of each container.

In another general aspect, a test chamber is configured to receive a container and to apply a controlled cycle of elevated pressure and reduced pressure to the container. A pressure transducer is connected to measure the pressure applied to the container and configured to produce a signal corresponding to the measured pressure. A sensor mounted to measure displacement of a portion of the container and configured to produce a signal corresponding to the measured displacement is connected to a controller. The controller is configured to receive the signals from the pressure transducer and the sensor and to analyze the signals to determine whether the container has a leak.

The test chamber may apply multiple pressure cycles to the container and the controller may measure a leak rate based on changes in a response of the container between different cycles. The controller also may be configured to control the pressure applied in the test chamber.

The test chamber may be configured to test multiple containers at the same time. To this end, a cassette loader may be configured to load containers on to cassettes, a rejector connected to receive a signal from the controller to reject a container and configured to remove the rejected container from the cassette, and a station may be configured to receive cassettes loaded with accepted containers and to remove the containers from the cassettes. The test chamber is configured to receive a cassette loaded with containers and to apply a controlled cycle of elevated pressure and reduced pressure to the containers. Multiple sensors are mounted to measure displacement of a portion of each of the containers in the test chamber and configured to produce signals corresponding to the measured displacements. The controller is connected to the sensors to receive the signals from the sensors and configured to analyze the signals to determine whether any of the containers have leaks.

Additional test chambers, in which each test chamber is configured to receive a cassette loaded with containers and to apply a controlled cycle of elevated pressure and reduced pressure to the containers, may be provided. The leak rate of each container may be measured by applying multiple pressure cycles and determining the leak rate with a controller configured to measure leak rates in the containers based on changes in responses of the containers between different cycles of increased and decreased pressure. Each container may include a flexible membrane that transitions between convex and concave orientations in response to changing pressure in the chamber. The controller may be configured to measure a leak rate based on a change in the pressure at which the transition occurs in different cycles of increased and decreased pressure.

Other features and advantages will be apparent from the following detailed description, including the drawings, and from the claims.

DETAILED DESCRIPTION

Figure 1A:
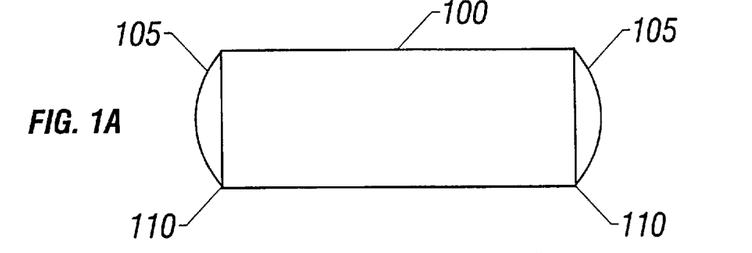
FIG. 1A is a side view of a container including two convex flexible membranes.

Referring to FIG. 1A, a container 100 includes a pair of flexible membranes 105. A membrane 105 may be a thin flexible foil or a plastic film cover. The container 100 may be filled with, for example, a single-dose pharmaceutical, such as nicotine gum, a beverage, such as fruit juice or water, or a food, such as yogurt. Containers specifically designed for storing particular single-dose pharmaceuticals are made of plastic and have a diameter of 0.25 inches and a length of 1 inch. They have two open ends that are sealed with membranes fabricated from an aluminum foil.

Figure 1B:
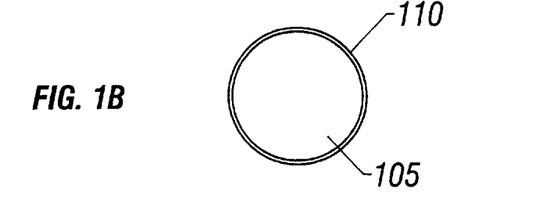
FIG. 1B is an end view of the container of FIG. 1A.

After container 100 is filled with a product, the ends are sealed with flexible membranes 105. A seal 110 between the container 100 and membrane 105 prevents the product from spoiling or from leaking out. Referring to FIG. 1B, seal 110 is made along the entire circumference of the end of container 100. The width of the seal can be controlled to adjust the area of the seal, and thereby to adjust the relative strength of the seal.

Figure 1C:
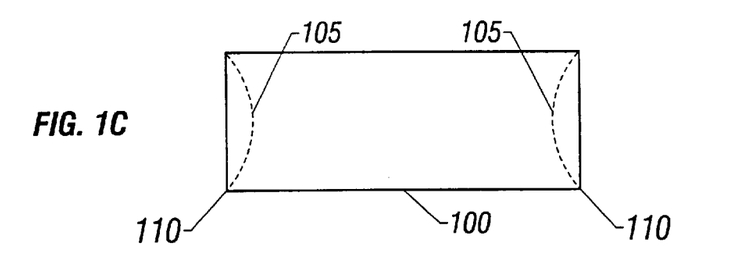
FIG. 1C is a side view of the container of FIG. 1A with the two flexible membranes in a concave orientation.

When container 100 is subjected to an increase in temperature or a decrease in atmospheric pressure, the volume of air or other gases in the container increases and displaces membranes 105 outward to form a convex shape such as is shown in FIG. 1A. Referring to FIG. 1C, when container 100 is exposed to a decrease in temperature or to an increase in atmospheric pressure, the volume of air or other gases in the container decreases and displaces membrane 105 inward to form a concave shape.

Figure 1D:
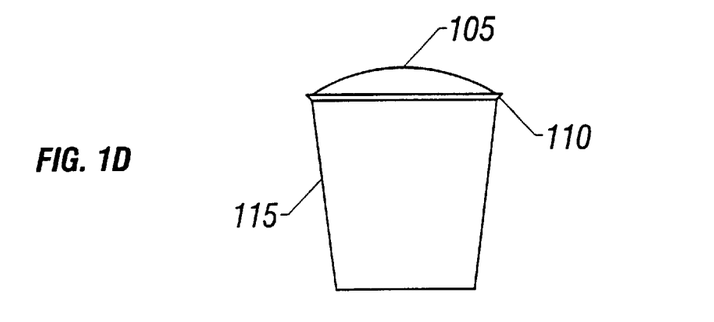
FIG. 1D is a side view of a container including one convex flexible membrane.
Figure 1E:
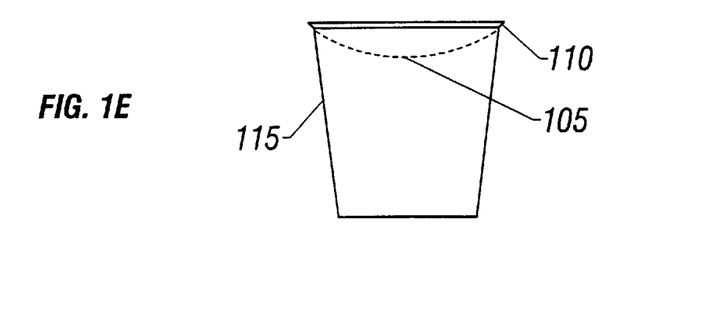
FIG. 1E is a side view of the container of FIG. 1D with the flexible membrane in a concave orientation.

Referring to FIG. 1D, a container 115 may have only one open end, with the end being sealed with a flexible membrane 105. Container 115 may be used, for example, to store foods or beverages, with the contents being accessed by removing membrane 105. As with a container with two flexible ends, when the volume of air or gases in the container increases, membrane 105 is displaced outward in a convex shape. Referring to FIG. 1E, when the air volume decreases, membrane 105 is displaced inward in a concave shape.

The transition of membrane 115 between concave and convex displacements occurs in response to a change in the pressure gradient across the membrane and occurs at a pressure in which there is a low differential pressure across the membrane. For example, if the pressure in container 115 without leaks is 14 psi and the atmosphere surrounding the container is at a vacuum of 10 psi, membrane 115 will be convex. If the atmospheric pressure is elevated at a set rate, the membrane will remain convex until the atmospheric pressure approaches 14 psi. At an atmospheric pressure slightly above the pressure within the container, the membrane will rapidly transition from convex to concave with an audible snap, where the pressure difference required to cause the transition corresponds to the stiffness of the membrane.

If the cycle is repeated under the same conditions, the membrane will transition again from convex to concave at an atmospheric pressure similar or identical to the atmospheric pressure at which the first transition occurred. If, however, there is a leak in the container, at the seal or otherwise, the mass quantity of gas within the container will decrease under the application of vacuum. Thus, if container 115 is subjected to a pressure cycle consisting of two long applications of vacuum, with a short period of rapidly elevated pressure following each vacuum application, membrane 105 will transition between convex and concave during each period of pressure elevation. Unlike the example described above in which the container did not leak and the transitions occurred at similar pressures, there will be an appreciable difference between the two transition pressures.

The difference in pressures relates to the leak rate in accordance with the ideal gas law: $PV=nRT$, where P is pressure, V is volume, n is the number of moles, R is the ideal gas constant, and T is the temperature. During the application of vacuum to a container 115 with a leaking seal, a quantity of the contents (e.g., n) of the container will pass through the leak in the seal because of the pressure difference. Because n decreases in the container, and T and R remain constant, the product of PV must decrease. Thus, when the atmospheric pressures is elevated after application of vacuum, the membrane transition will occur at a lower atmospheric pressure because the pressure in the container's interior will be lower. For this reason, measuring the transition pressures provides a way to determine the presence or absence of a leaking seal. As an alternative to applying an extended vacuum to reduce the number of moles in the container, an extended pressure elevation can be used to increase the number of moles in the container.

The difference between the transition pressures also may be used to determine the leak rate. Once the initial membrane transition pressure is measured, application of a pressure/vacuum cycle of a known vacuum pressure for a known time will result in a second transition pressure when the pressure is elevated. The difference in the transition pressures over time is proportional to the leak rate. By manipulating the ideal gas law and assuming that changes in the initial container volume and pressure are negligible during the pressure cycle, a flow rate equation can be derived: $Q_f=(\Delta p/\tau)(V_o/P_o)$, where $Q_f$ is the flow rate of the leak, $\Delta p$ is the difference in transition pressures, $\tau$ is the test time, $V_o$ is the initial container volume, and $P_o$ is the initial container pressure. Because $\Delta p$, $\tau$, $V_o$, and $P_o$ are known or measured values, the leak rate can be calculated after two membrane transitions.

The leak rate also may be determined based on only one transition of the membrane. The leak rate can be measured in this manner if the pressure differential that causes the membrane transition is known to a high degree of accuracy, if the absolute value of the external container pressure is known at the instant of the membrane's transition, and if the rate of change of the external pressure is known. These three parameters sufficiently and uniquely identify a hole size and, correspondingly, a leak rate of the contents of the container.

Experiments have shown that containers with leaks having equivalent hole diameters above seven microns were found to have no membrane transition or relatively poor membrane movement, so that no significant transition occurs. These grossly leaking containers may be identified by the lack of a transition or by measuring a lower absolute pressure value at which the membrane transition occurs.

The pressure differential across a leak accelerates the gas flow through the leak. The gas flow rate through the leak also is affected by gas diffusion resulting from differences in partial pressures of gases in the container interior and surrounding atmosphere. For instance, a high nitrogen concentration in the container and a low nitrogen concentration in the atmosphere would result in nitrogen diffusion from the container to the atmosphere. However, the rate of gas flow from diffusion is negligible compared to that resulting from direct flow due to the pressure difference. Consequently, an accurate leakage rate may be determined by treating the gas flow through the hole as being based solely upon the change in pressure over time.

Figure 2:
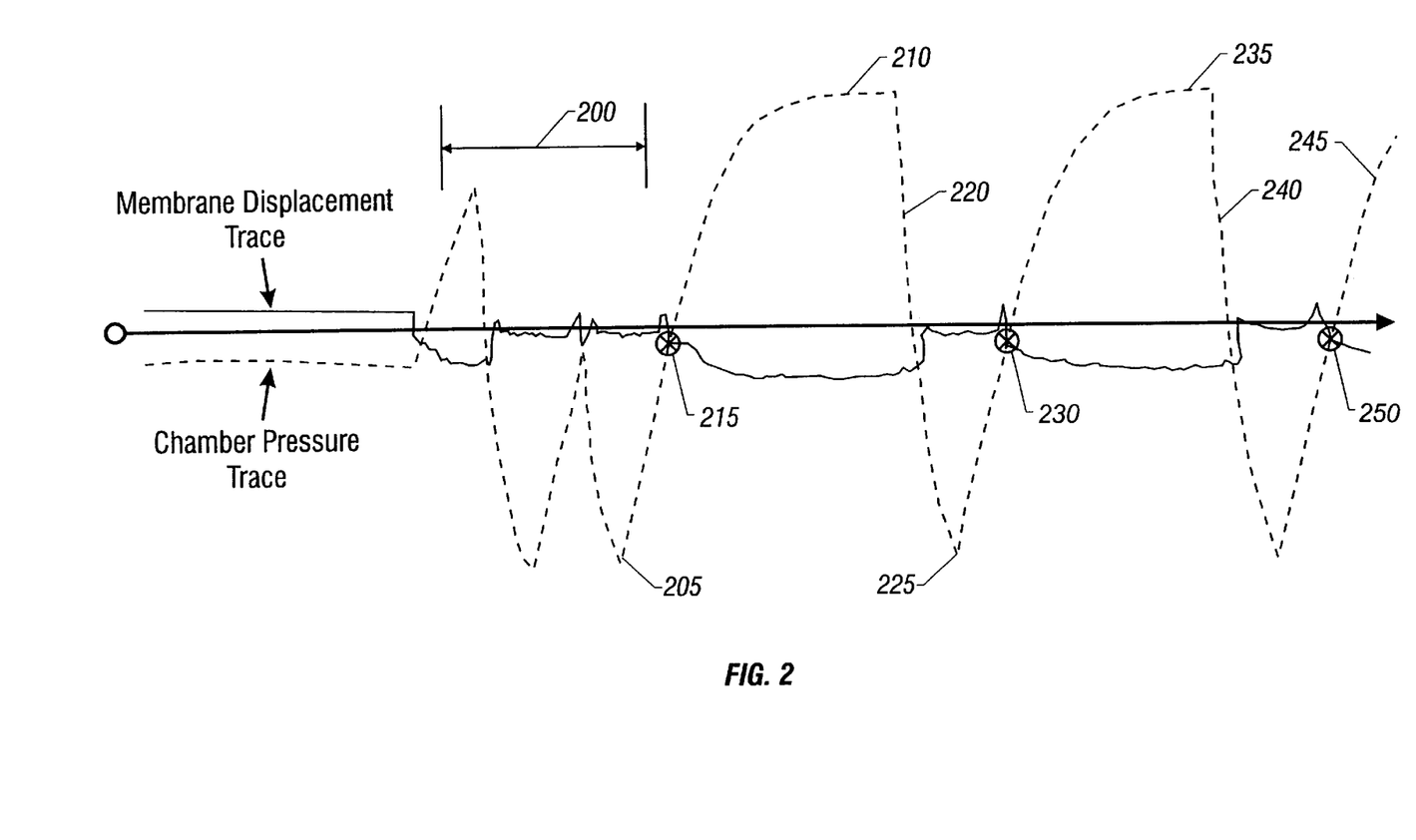
FIG. 2 is a graph showing the change in pressure and membrane displacement over time.

Referring to FIG. 2, a graph from a strip chart recorder illustrates the displacement of the membrane 105 relative to the change in pressure of the atmosphere surrounding the container. Initially, an exercising cycle 200 in which the pressure is rapidly elevated and reduced is applied to exercise the membrane to remove residual stresses. Following the membrane exercising, at point 205, the pressure in the atmosphere surrounding the container is at a vacuum of 23 in. Hg. To begin the leak rate detection procedure, the pressure is rapidly increased to a maximum pressure of 15 psig to begin a first pressure soak 210. During the pressure increase, at a certain pressure the membrane transitions from convex to concave (215) with an audible snap. For the purpose of determining the leak rate, this transition pressure, $p_1$, is termed the first transition pressure.

After the pressure is increased, it is held constant at an increased pressure for a set time to provide a pressure gradient to drive the flow of gas through the leak. During testing of containers storing nicotine gum, the increased pressure is held constant for 35 seconds. After the set time has passed, the pressure is rapidly decreased (220) to a vacuum of approximately 23 in. Hg (225), causing the membrane to transition from concave to convex. The pressure then is elevated rapidly. During this pressure elevation, the membrane transitions from convex to concave (230). To determine the leak rate, this transition pressure, $p_2$, is termed the second transition pressure. As indicated in FIG. 2, a second period of elevated pressure (235) exposure and a rapid pressure reduction (240) and elevation (245) can be used to find a third transition pressure, $p_3$ (250). The pressure difference used to calculate the leak rate, $Q_p$, can be either $(p_1-p_2)$ or $(p_2-p_3)$. Experiments have demonstrated that leak rates caused by equivalent hole diameters as small as 4 microns can be measured using this method.

FIG. 2 also illustrates the nonlinear relationship between membrane displacement and pressure. When the pressure is changed from elevated to reduced values, the displacement of a sealed membrane will remain close to its maximum value until the membrane transitions rapidly in a nonlinear manner between convex and concave. This results from the partial rigidity of the material from which the membrane is formed.

Although the material from which the membrane is fabricated is flexible, the membrane also has natural rigidity that resists a gradual change in shape in response to changes in pressure. Thus, a change in shape will be rapid and accompanied by a snap. Experiments have demonstrated that a gross leak is indicated by the absence of a rapid snapping of the membrane as the membrane makes the transition between concave and convex, or by the lack of such a transition. If the transition occurs slowly, after a prolonged period, or not at all, the container may have a leak, where the failure of a transition to occur is indicative of a gross leak.

Figure 3:
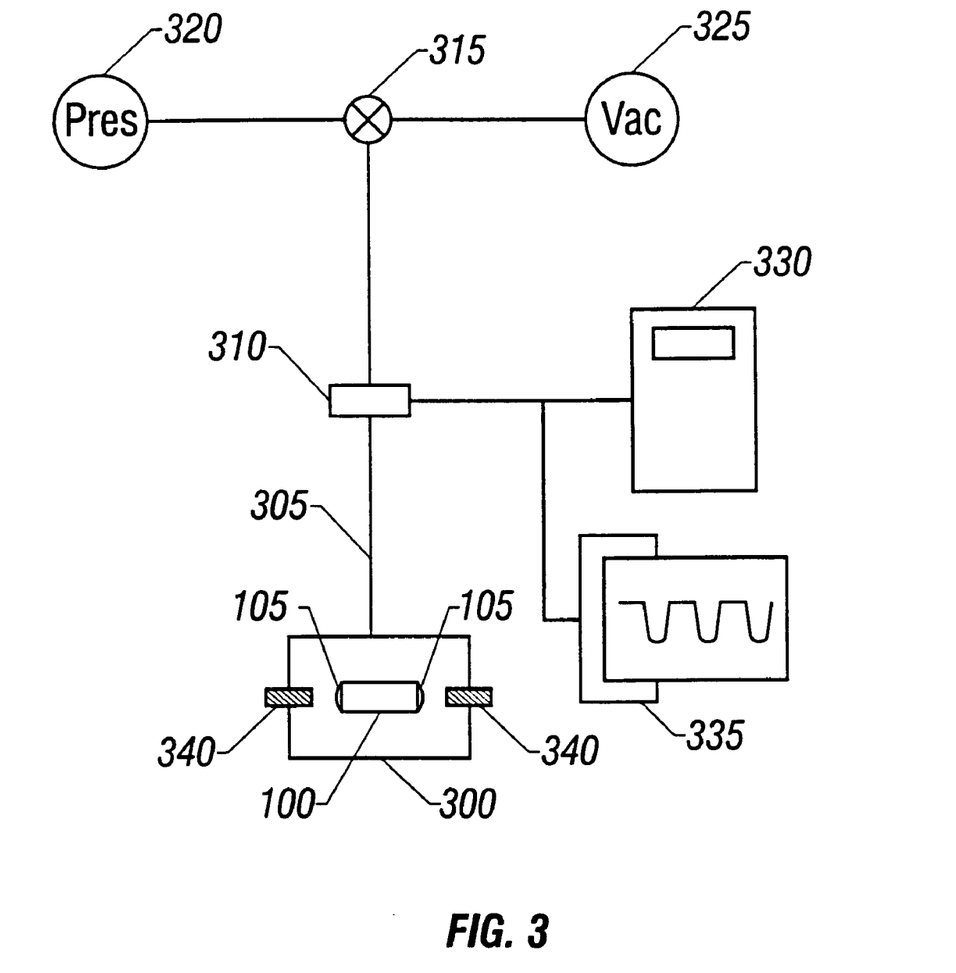
FIG. 3 is a block diagram of a leak detection and rate measurement system.

Referring to FIG. 3, in one implementation, the container 100 is placed in a test chamber 300. Test chamber 300 is attached to a pressure line 305 which includes a pressure transducer 310 that measures the pressure in line 305 to determine the pressure in chamber 300. Line 305 is connected to a valve 315 that can be used to alternate between a pressure source 320 and a vacuum source 325. The pressure measured by pressure transducer 310 may be displayed on a pressure readout 330. The variation of pressure over time can be recorded on a strip chart recorder 335.

To determine the presence of a leak in the container, such as a leaking seal between the container and the membrane, a pressure variation cycle is applied to the chamber and a pair of sensors 340 are used to measure the displacement of the flexible membranes 15 of the container. The sensors 340 can be implemented using, for example, laser displacement sensors. Other displacement measuring devices, such as inductive or capacitive proximity sensors and mechanical sensors, also may be used.

The pressure variation cycle is initiated by moving valve 315 to apply pressure from pressure source 320 so as to elevate the pressure in the chamber 300 to 15 psig. When the pressure is applied, the displacement of the membranes will be concave. After maintaining the elevated pressure for a short time (e.g., 35 seconds), valve 315 is adjusted to apply a vacuum from vacuum source 325. For example, a vacuum of 23 in. Hg may be applied to the chamber. When the vacuum is applied, the deflection of the membranes will be convex. Immediately after the desired level of vacuum is obtained, valve 315 is returned to the position in which pressure source 320 applies pressure to the chamber. When the pressure in the chamber increases to a sufficient level, the membrane of a sealed container will move from a convex to a concave position.

The sensors 340 measure displacement of the membranes during the pressure variation cycle. They produce a signal that is transmitted to the strip chart recorder 335 for display.

Figure 4A:
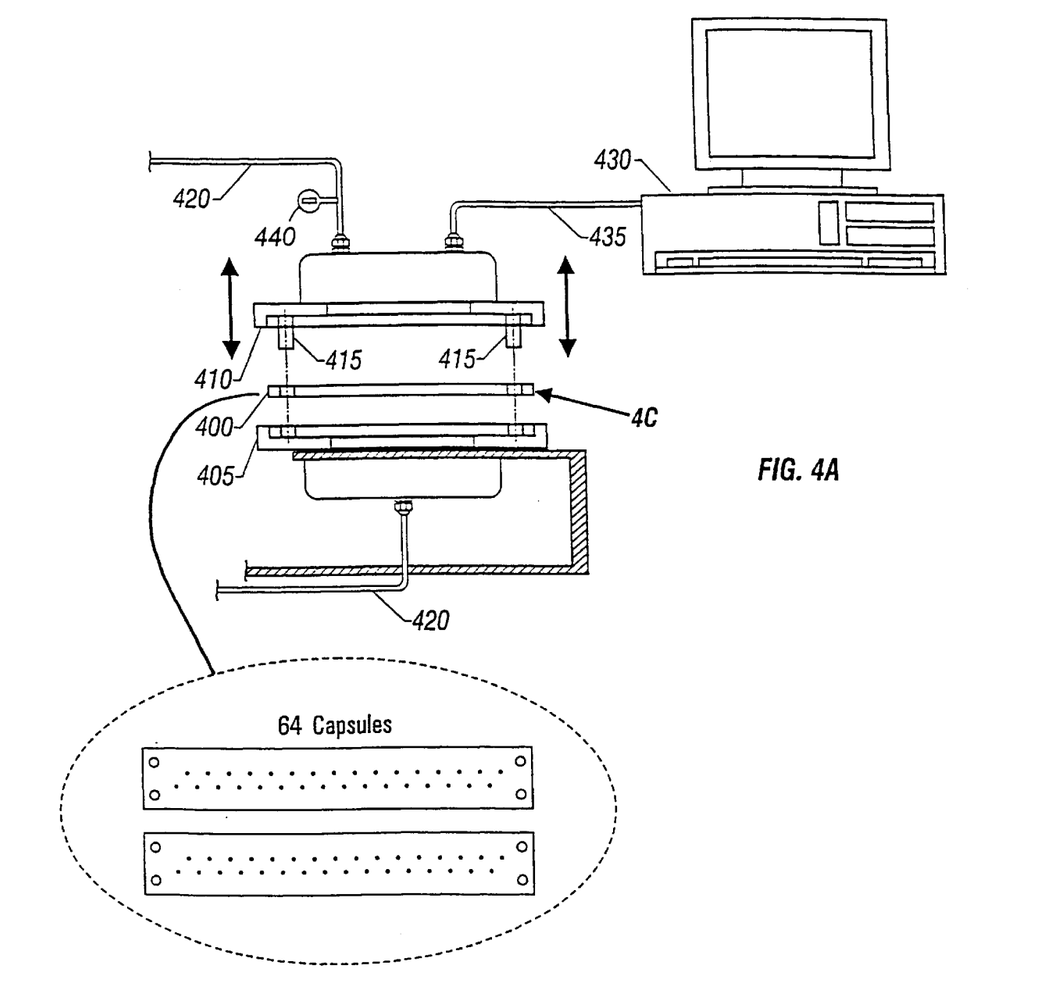
FIG. 4A is a block diagram of a multi-container leak detection and rate measurement system.

Referring to FIG. 4A, a system for simultaneously measuring leak rates in multiple containers includes a pair of container assembly cassettes 400. The cassettes fit between a fixed lower chamber section 405 and a movable upper chamber section 410. A pair of guide pins 415 connected to upper section 410 pass through holes in cassettes 400 into holes in lower chamber section 405. The upper chamber section 410 moves up to permit placement of cassettes 400 onto lower chamber section 405 and moves down to close the chamber to permit application of pressure and vacuum. Pressure and vacuum is applied through a pair of pressure/vacuum lines 420 connected to the chamber sections.

Figure 4B:
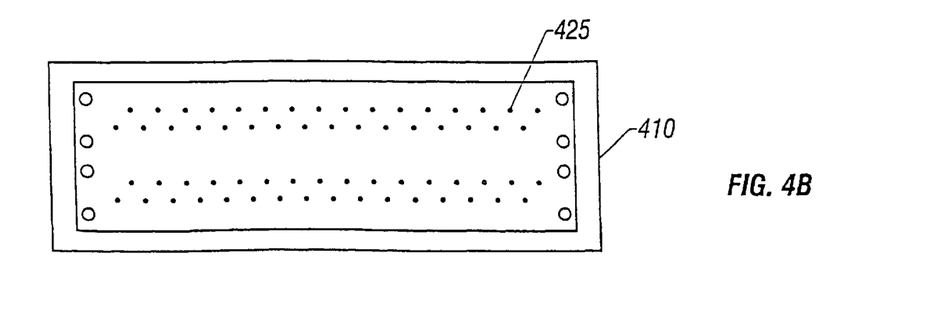
FIG. 4B is a bottom view of an upper chamber section of the system of FIG. 4A.

Referring also to FIG. 4E, upper chamber section 410 includes a sufficient quantity of sensors 425 to monitor displacement of a membrane of each container placed in assembly cassettes 400. Sensors 425, which may be proximity sensors, are wired to a computer 430 through leads 435. The displacement of each membrane is measured and transmitted to the computer 430. Computer 430 also records the chamber pressure as measured by a pressure transducer 440 that is electrically connected to the computer. Using the sensed pressure, the computer 430 determines the pressure at which the membrane on each container snaps between convex and concave orientations. As described above, the difference in pressure between subsequent snaps is proportional to the leak rate.

The system may be operated by placing containers into the cassettes 400 and by lowering upper chamber 410 against lower chamber 405. The computer 430 then applies a pressure sequence to the chamber and determines the pressures at which each membrane snaps. The sequence includes two short pressure peaks separated by a vacuum purge to exercise the membrane to remove residual stresses.

Following the membrane exercise, a vacuum is applied before starting the first of two pressure soaks. Each pressure soak includes an increase in pressure to a maximum of approximately 15 psig that is held constant for a set period of time. The time is adjustable on the computer and may be in a range between 35 and 65 seconds. During application of pressure, gas may flow into a container if there is a leak in the membrane of the container. After each pressure soak, a vacuum purge to approximately 23 in Hg vac. is rapidly applied before initiating the next pressure soak.

In the transition from vacuum to pressure, the membrane may snap from convex to concave. The computer determines that the membrane has snapped based on the rapid change in displacement of the membrane and records the pressure at which the snap occurs for each container. Thus, at the end of the sequence, the computer has recorded two pressures for each membrane, indicating that two snaps occurred. The computer than calculates the difference between the two pressures to determine the leak rate. If there is no difference in pressure, the container does not have a leak. As noted above, if a snap does not occur for a particular container, this indicates that the container has a gross leak with a large leakage rate.

Alternatively, a vacuum cycle can be performed in place of the pressure cycle. In this case, the cycles are identical except that the applications of pressure and vacuum are reversed.

Figure 5:
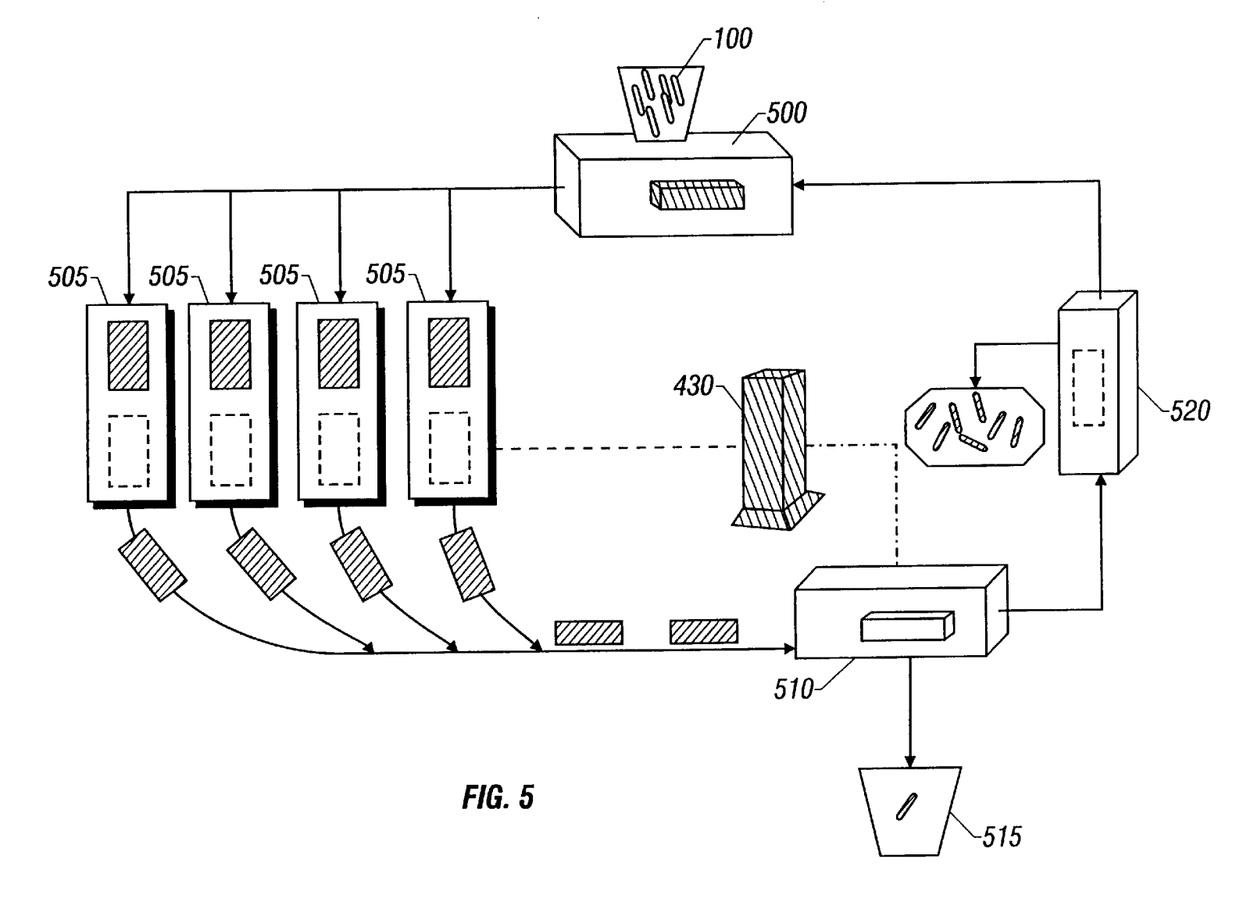
FIG. 5 is a block diagram of a conveyor-based multi-container leak detection and rate measurement system.

Referring to FIG. 5, a high speed system for testing for leaks in containers includes a container feed system 500 to feed containers 100 onto container cassette 400. A conveyor system carries the cassettes 400 into a parallel configuration of test chambers 505 in which the pressure is varied to cause membrane displacements to determine leak rate of individual containers. The membrane displacements are measured as described above by sensors 425. The signals corresponding to the membrane displacements are sent to controller 430, which determines whether to accept or reject individual containers. The cassettes 400 are carried from test chambers 505 into a reject station 510, which is configured to receive a reject signal from controller 430. Reject station 510 rejects individual containers by using pulses of air aimed at the individual containers, with the individual pulses of air being initiated by the reject signal from controller 430. The rejected containers are blown by the pulses of air into a reject bin 515. The cassettes 400 holding accepted containers are carried to container recovery station 520 where the containers are removed from the cassettes. Thereafter, the containers are conveyed to be packaged and the empty cassettes are conveyed to container feed system 500.

During high speed production of containers, 1,000 to 1,600 containers may be processed per minute. Under these conditions, merely determining the presence or absence of a gross leak may be acceptable. As noted, the presence or absence of a membrane snap during the transition between pressure and vacuum may indicate the presence or absence of a gross leak. Thus, detection of such a snap may be sufficient for high speed container evaluation.

Figure 6:
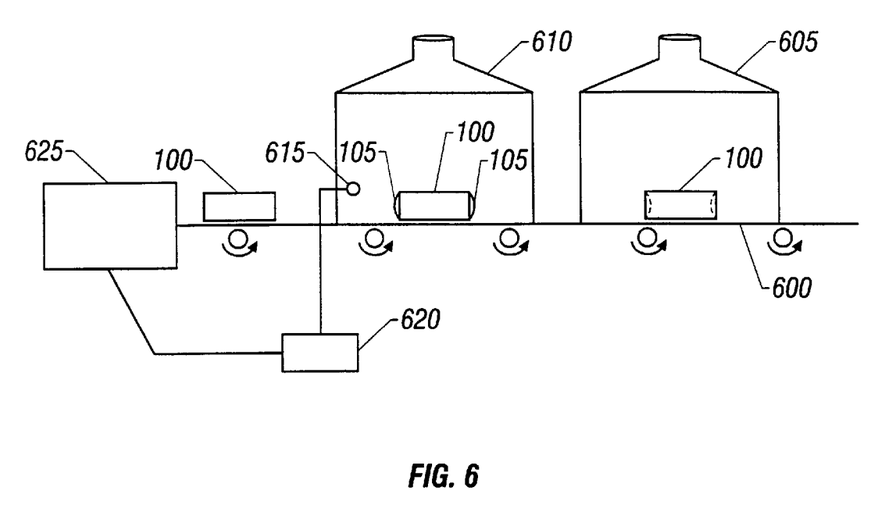
FIG. 6 is a block diagram of a conveyor-based leak detection system.

Referring to FIG. 6, a system to provide high speed testing of containers moving on a conveyor 600 may use sequential applications of cooled air and heated air to vary the pressure in the container. Conveyor 600 carries a container into a cooled hood 605, which causes the gas within the container to contract. The contraction decreases the pressure within the container and causes a concave displacement of membranes of the container. The temperature and length of the cold zone depends on the container and contents of the container. The temperature must not be cold enough to damage the contents of the container. For example, to test a container storing nicotine gum, the cold zone would be cooled to 0 to 5° Celsius and have a length of 12 to 20 inches.

After the container passes through hood 605, the conveyor carries the container into a heated hood 610. Hot air in the hood 610 causes the gas within the container to expand. The expansion increases the pressure within the container and causes a convex displacement of membranes 105. This transition from concave to convex occurs as a snap if there is no leak in the container. If there is a gross leak within the container, the membrane will not snap as it transitions from concave to convex. In fact, if the leak is very large, the membrane may not move at all.

The temperature of the hot air must not be high enough to damage the contents of the container. For example, to test a container storing nicotine gum, the hot zone would be heated to 40° Celsius and have a length of 12 to 20 inches.

The transition of the membrane is detected by a sensor 615, mounted in hood 610. Sensor 615 can be implemented as a microphone, a light source and detector, or a high speed vision system camera with imaging software. The sensor detects the presence or absence of either the audible or visual indication of the snap of the membrane and sends a signal to a controller 620. The controller 620 processes the signal to determine whether the container should be accepted or rejected.

When the sensor is implemented as a microphone, the microphone detects the magnitude of the snap and sends a signal based on the magnitude of the snap to the controller. The controller analyzes the signal to determine if it is above a set value and occurs at the expected time. By contrast, a light source detector focuses a beam of light on the membrane and the reflected light is detected by a sensor.

Similarly, the high speed camera detects the movement of the membrane and sends signals to the controller, which employs imaging processing software to analyze the signal. The lack of movement within a predetermined portion within the heated zone is indicative of a leak. If a leak is detected, controller 620 sends a signal to rejector 625. Rejector 625 uses a pulse of air to blow a rejected container off of conveyor 600.

As an alternative to containing heated air, hood 610 can contain a blower that directs high velocity air across the container. The high velocity air passing across the container causes a low pressure region around the container. If this low pressure is sufficiently lower than the pressure of the container, the membranes will transition from concave to convex.

If there is a minuscule leak or no leak at all, the snapping action of the membrane will be audible. To detect the snapping action, a sensor 615 is placed at the exit to hood 610. As above, sensor 615 may be implemented as a microphone, a light source and detector, or a high speed vision system camera with imaging software. The sensor detects the presence or absence of either the audible or visual indication of the snap of the membrane and sends a signal to a controller 620. The controller analyzes the signal to determine if it is meets the accept criteria. Controller 620 also may calculate the time required for the snap to occur to provide an indication of the extent of the leak. After determining whether to accept or reject a container, the conveyor passes the container into rejector 625 where a burst of air blows rejected capsules off of the conveyor.

Other embodiments are within the scope of the following claims.

What is claimed is:

1. An apparatus for determining whether a container including a flexible membrane and moving along a conveyor has a leak, the apparatus comprising:
    a first region through which the conveyor carries the container and in which a negative pressure differential between the first region and the interior of the container is established;
    a second region through which the conveyor carries the container and in which a positive pressure differential between the second region and the interior of the container is established by passing the container through a zone in which a gas, moving at a high velocity, passes across the lid of the container to produce a low pressure zone around the container;
    a sensor configured to detect a transition of the membrane of the container between convex and concave orientations and to produce a signal corresponding to the occurence of the transition; and
    a controller connected to receive the signal from the sensor and configured to determine whether the container has a leak based on the transition of the membrane.

2. The apparatus of claim 1, wherein the container passes through the first region prior to passing through the second region and the sensor detects a transition of the membranes from a concave orientation to a convex orientation in the second region.

3. The apparatus of claim 1, wherein the container passes through the second region prior to passing through the first region and the sensor detects a transition of the membranes from a convex orientation to a concave orientation in the first region.

4. The apparatus of claim 1, wherein the controller determines whether the container has a leak based upon a time at which the transition of the membrane occurs.

5. The apparatus of claim 1, further comprising a rejector configured to remove a container from the conveyor, wherein the controller is configured to send a signal to a rejector to reject a container when the controller determines that the container has a leak.

6. The method of claim 1, wherein determining whether the container has a leak comprises examining a time at which the transition of the membrane occurs.

7. The apparatus of claim 1, wherein the first and second regions comprise constantly open entrance ends into which the conveyor carries the container and constantly open exit ends from which the conveyor carries the container.

8. The apparatus of claim 1, wherein the conveyor continuously carries containers through the first and second regions.

9. The apparatus of claim 1, wherein the sensor comprises a microphone configured to detect an audible snap.

10. The apparatus of claim 1, wherein the sensor comprises a light source and detector configured to detect the transition of the membrane.

11. The apparatus of claim 1, wherein the sensor comprises a vision system camera with imaging software configured to detect the transition of the membrane.

12. The method of claim 1, wherein detecting the transition of the membrane comprises using a microphone configured to detect an audible snap.

13. The method of claim 1, wherein detecting the transition of the membrane comprises using a light source and detector configured to detect the transition of the membrane.

14. The method of claim 1, wherein detecting the transition of the membrane comprises using a vision system camera with imaging software configured to detect the transition of the membrane.

15. The method of claim 1, wherein the first and second regions comprise constantly open entrance ends into which the conveyor carries the container and constantly open exit ends from which the conveyor carries the container.

16. An apparatus for determining whether a container including a flexible membrane and moving along a conveyor has a leak, the apparatus comprising:
    a first region through which the conveyor carries the container and in which a negative pressure differential between the first region and the interior of the container is established, the first region including constantly open entrances and exit ends;
    a second region through which the conveyor carries the container and in which a positive pressure differential between the second region and the interior of the container is established by passing the container through a zone in which a gas, moving at a high velocity, passes across the lid of the container to produce a low pressure zone the container, the second region including constantly open entrance and exit ends;
    a sensor configured to detect a transition of the membrane of the container between convex and concave orientations and to produce a signal corresponding to the occurence of the transition; and
    a controller connected to receive the signal from the sensor and configured to determine whether the container has a leak based on the transition of the membrane.

17. The method of claim 1, wherein the conveyor continuously carries containers through the first and second regions.

18. The apparatus for determining whether a container including a flexible membrane and continuously carried along a conveyor has a leak, the apparatus comprising:
    a first region through which the continuously moving conveyor carries the container and in which a negative pressure differential between the first region and the interior of the container is established;
    a second region through which the continuously moving conveyor carries the container and in which a positive pressure differential between the second region and the interior of the container is established by passing the container through a zone in which a gas, moving at a high velocity, passes across the lid of the container to produce a low pressure zone around the container;
    a sensor configured to detect a transition of the membrane of the container between convex and concave orientations and to produce a signal corresponding to the occurence of the transition; and
    a controller connected to receive the signal from the sensor and configured to determine whether the container has a leak based on the transition of the membrane.

19. The method of claim 1, wherein establishing the positive pressure differential in the second region includes passing the container through zone in which gas moving at a high velocity passes around the container to produce a low pressure zone around the container.

20. A method for determining wether a container including a flexible membrane and continuously carried along a conveyor has leak, the method comprising:

in a first region through which the continuously moving conveyor carries the container, establishing a negative pressure differential between the first region and the interior of the container;

in a second region through which the continuously moving conveyor carries the container, establishing a positive pressure differential between the second region and the interior of the container by passing the container through a zone in which a gas, moving at a high velocity, passes across the lid of the container to produce a low pressure zone across the lid of the container;

detecting the transition of the membrane of the container between concave and convex orientations ans producing a signal corresponding to the occurence of the transition; and using the signal to determine whether the container has a leak based on the transition of the membrane.

21. A method for determining whether a container including a flexible membrane and moving along a conveyor has a leak, the method comprising:

in a first region through which the conveyor carries the container, establishing a negative pressure differential between the first region and the interior of the container, the first region including constantly open entrance and exit ends;

in a second region through which the conveyor carries the container, establishing a positive pressure differential between the second region and the interior of the container by passing the container through a zone in which a gas, moving at a high velocity, passes across the lid of the container to produce a low pressure zone around the container, the second region including constantly open entrance and exit ends;

detecting the transition of the membrane of the container between concave and convex orientations and producing a signal corresponding to the occurence of the transition; and using the signal to determine whether the container has a leak based on the transition of the membrane.

* * * * *